United States Patent [19]

Dziemba et al.

[11] Patent Number: 4,699,372
[45] Date of Patent: Oct. 13, 1987

[54] TRANSPORT MECHANISM

[75] Inventors: Peter Dziemba, Bad Nauheim; Karl Wenderoth, Bad Vilbel, both of Fed. Rep. of Germany

[73] Assignee: MAP Mikrofilm Apparatebau Dr. Poehler GmbH & Co. KG, Ober-Morlen, Fed. Rep. of Germany

[21] Appl. No.: 699,581

[22] Filed: Feb. 8, 1985

[30] Foreign Application Priority Data

Feb. 8, 1984 [DE] Fed. Rep. of Germany ....... 3404384

[51] Int. Cl.$^4$ ............................................. B65H 9/16
[52] U.S. Cl. ..................................... 271/251; 271/252
[58] Field of Search ............... 271/228, 249, 251, 252, 271/272, 274

[56] References Cited

U.S. PATENT DOCUMENTS

3,107,090 10/1963 Templeton ........................... 271/251
3,175,824 3/1965 Albosta ................................ 271/251
4,092,022 5/1978 Preuss ............................. 271/272 X
4,410,171 10/1983 Kobayashi ...................... 271/252 X
4,544,151 10/1985 Dziemba ........................ 271/272 X Primary Examiner—Richard A. Schacher
Attorney, Agent, or Firm—Wegner & Bretschneider

[57] ABSTRACT

A transport mechanism for film cards having two rocker levers supported on a pivoting lever that can swivel around a shaft, with the rocker levers being capable of pivoting around a rocker lever shaft. The two rocker levers, in turn, support two opposite discs, one of which is driven by a motor. A gripping motion of the discs is brought about by provision of guide grooves located on the rocker levers, with each groove accommodating a stationary pin. Through provision of an intermediate carrier, the upper disc is fixed to the upper rocker lever in a manner that it can pivot around a horizontal axis which is at right angles to the rocker lever shaft. Therefore the upper disc can be tilted in the respective direction of transport.

10 Claims, 9 Drawing Figures

TRANSPORT MECHANISM

BACKGROUND OF THE INVENTION

This invention relates to a transport mechanism for transporting a film card (microfiche) or comparable object, guided between two straight guides, from one station to another, for example for transporting a film card from a film card holder to a film card magazine, having a feeder mechanism for gripping and transporting a film card or comparable object. Said feeder mechanism is positioned at the end of a straight guide where the transport is to be carried out and can be moved at right angles in relation to the film card or comparable object. The feeder mechanism has two discs which are able to rotate and to perform a pincer-wise motion towards the film card or comparable object and form an acuate angle in gripping position. At least one of said discs is provided with a motor, the direction of rotation of which can be reversed, according to co-pending U.S. patent application Ser. No. 541,583, now U.S. Pat. No. 4,544,151.

In the embodiment described in the U.S. Pat. No. 4,544,151, the discs are provided at one end of a relatively long lever. When these two levers pivot towards the film card, the discs approach each other, thus rendering it possible for the respective film card to be gripped and transported. As it is necessary that one of the discs tilt in the respective direction of transport at an inclined angle relative to the film card, one of the discs is mounted pivotably on the corresponding lever in a manner that renders it possible for the disc to tilt independently towards the respective direction of transport.

The film cards or comparable objects which are to be transported with a transport mechanism are often of different thickness or undulated as a result of internal stress. With the mechanism such as discloses in the U.S. Pat. No. 4,544,151, such differences in the qualities of the objects to be transported make it necessary to optimize the entire mechanism for the respective application by appropriate dimensioning of the levers. That is to say, for different applications, strongly differing transport mechanisms have to be manufactured, which is uneconomical.

SUMMARY OF THE INVENTION

This invention is based on the primary object of refining the transport mechanism such as disclosd in the U.S. Pat. No. 4,544,151 in a manner that renders it possible for objects with different qualities to be transported reliably without or with merely minor alterations of the mechanism.

This object is established according to the invention by provision of two rocker levers for locating the discs. Said rocker levers are mounted pivotably on a swivelling lever which can be moved at right angles in relation to the direction of transport. For purposes of control of the gripping motion performed by the discs each rocker lever is adjustably supported through a support pin eccentrically mounted on the frame through a screw, and a cooperating guide, in the form of a groove, at the ends of the levers pointing away from the discs.

This design according to the invention makes for control of the gripping motion by the two guides. Therefore this motion can be influenced in a manner that affords optimal gripping and transport of the film cards to be transported. For the various applications, the position of the stationary pins can be adjusted, hence adjusting the entire transport mechanism with a relatively small effort.

An additional advantage of the transport mechanism according to the invention rests with the fact that all its component parts can be combined in one assembly, hence eliminating the necessity of controlling levers at different positions in the apparatus the transport mechanism is intended for. Therefore an operational check of the transport mechanism can be carried out before it is installed in the respective apparatus.

It is advantageous for the design to support the rocker levers on the swivelling lever by a mutual rocker level shaft. This makes it possible for the levers to cross each other in a pincer-wise motion. This, however, is not necessary as the gripping motion can be controlled as desired by the pin and guides.

It is a preferred embodiment of the invention to support one of the discs on a carrier which is fixed to the respective rocker lever in a manner that makes possible for the carrier to tilt between two stops and around an axis at right angles in relation to the direction of transport.

The transport mechanism such as disclosed in the U.S. Pat. No. 4,544,151 featured one disc being capable of swivelling in the respective direction of transport. This feature, however, had the effect that the portions of the discs making contact with each other performed slightly different movements, resulting in the film cards being subjected to shearing forces and, as a consequence, in abrasion and loss of kinetic energy. These shortcomings are eliminated by the present invention. Even in the tilted position, the contours of the discs remain congruent, hence insuring that no relative velocities occur in the contact areas.

As an effect of the gripping motion, the disc swivelled in the direction of transport tends to move back to a horizontal position. If, however, the carrier is retained against one of its stops by means of a spring, and a lifting magnet is employed for pivoting the carrier torwards the other stop, the disc can be forced to tilt, hence affording a more reliable transport of the film cards or comparable objects.

The pin and guide arrangement is especially simple in its design when the ends of the rocker levers pointing away from the discs have one groove each, and when each groove accommodates a stationary pin.

By providing the pins eccentrically on an adjustment screw, it is possible to adjust the gripping travel and the gripping plane.

By designing the shape of the grooves to be initially horizontal and then to follow an inclined path, a result is achieved whereby the discs initially do not carry out a gripping motion while travelling from a lateral position to a position above the film cards or comparable objects. When regarding the two discs as separate jaws of a pair of tongues, one can say that this pair of tongues can reach above and below the film cards before it closes.

The movement of the transport mechanism from a resting position to the transport area where the film card or comparable object is to be gripped is most easily achieved when the swivelling lever is retained in a resting position by means of a spring and when the transport mechanism features a lifting magnet for pushing the swivelling lever into an operating position of the two discs.

In order to render it possible for film cards stored in a film card magazine to be gripped and transported by the transport mechanism according to the invention, it is necessary that the film card magazine posess a recess at one corner as disclosed in U.S. patent application Ser. No. 572,077, filed Jan. 19, 1984, and embodied herein by reference. The film cards are not guided in this area. This can result in the face edges of the film cards having different distances from one another in the area of said recess. By means of a separator having two separating surfaces with a slot therebetween, the film cards can be separated even in such event, so that one specific film card can be gripped and transported by the discs.

In another preferred embodiment, the separator is made with the edge facing the film cards at an inclined angle with respect to the direction of transport, to thereby pick up the respective film card by the separator not from the front but farther to the back, close to the point where the film card is guided by the film card magazine. Therefore reliable gripping of the film cards is possible even when the front edges of the film cards make contact with each other.

It is furthermore favorable that the separator be pretensioned in the direction of the film card or comparable object by means of a spring, that a separator cam rests against the rocker lever shaft and that the travel of the separator following the shaft is limited by means of elongated holes. This makes it possible for the separator to advance faster than the discs, separate the film cards and then come to a stop, so that the disc can travel farther in order to grip and transport the film cards.

BRIEF DESCRIPTION OF THE DRAWING

The invention will be better understood, and objects other than those set forth above will become apparent, when consideration is given to the following detailed description thereof. Such description makes reference to the annexed drawings wherein.

DESCRIPTION OF THE PREFERRED EMBODIMENT

Figure 1:
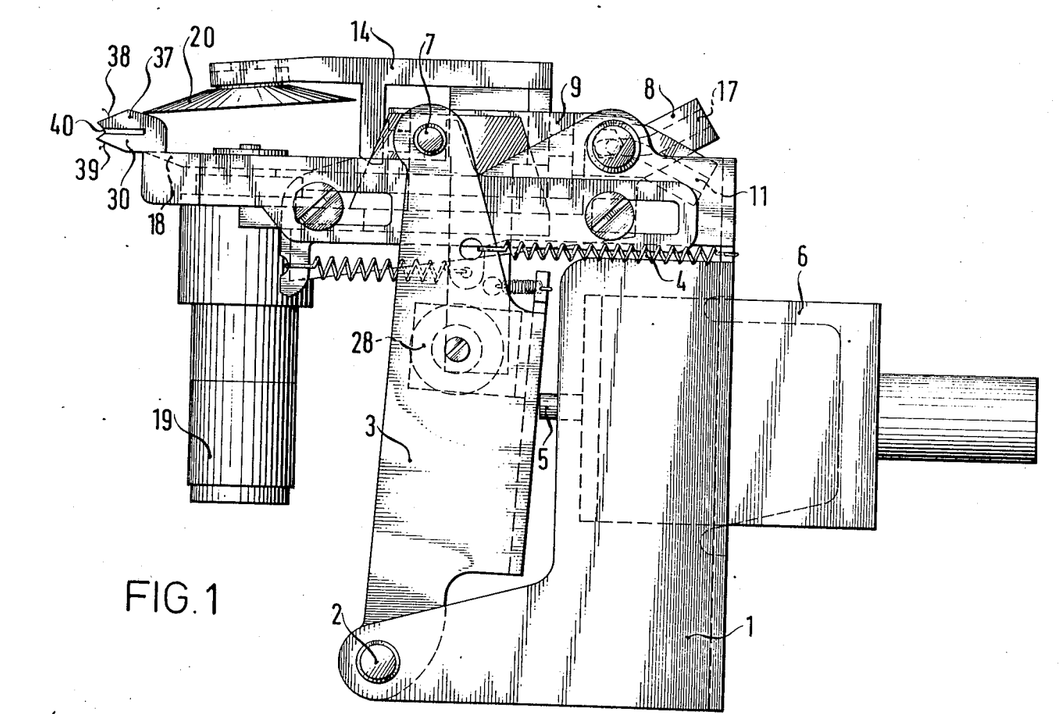
FIG. 1 is a side elevational view of a transport mechanism according to the invention.

FIG. 1 shows a frame 1 supporting a pivoting lever 3 by means of a shaft 2. A tension spring 4, tensioned between the pivoting lever 3 and the frame 1 keeps the pivoting lever 3 in front of the ram 5 of a lifting magnet 6. When the latter is excited, the pivoting lever 3 pivots from its resting position into an operating position counter-clockwise, that is towards the left in the drawing.

Figure 4:
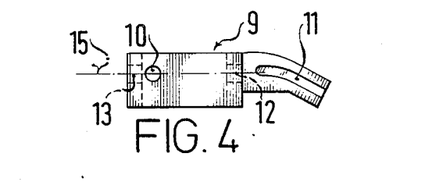
FIG. 4 is a side elevational view of an upper rocker lever as one component part of the transport mechanism.

On the other end of this pivoting lever 3 two rocker levers 8 and 9 are supported by means of a mutual rocker lever shaft 7. Further details on the design of these rocker levers 8 and 9 can best be taken from FIGS. 4 and 5. FIG. 4 shows the upper rocker lever 9 as one component part, whereas in FIG. 5 the lower rocker lever is shown as one component part.

In FIG. 4 a bore 10 is to be seen in the upper rocker lever 9 accommodating the rocker lever shaft 7 when mounted. The upper rocker lever 9 has a groove 11 at its right end in the drawing, the course of which moves from an initial horizontal direction towards a downward inclination. In addition the rocker lever 9 has two horizontal bores 12 and 13 into which a brace 14 illustrated in FIG. 3 can be inserted in a manner that it can swivel around a horizontal axis 15 which is at right angles in relation to the rocker lever shaft 7.

Figure 5:
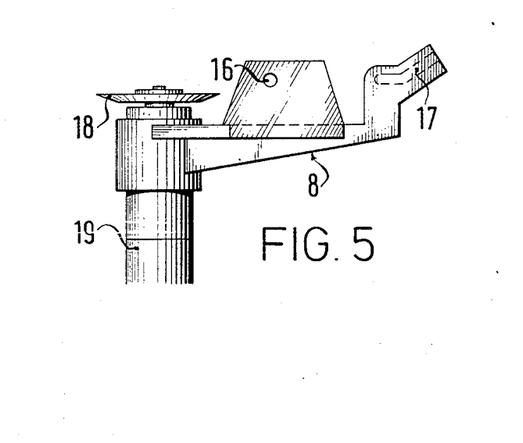
FIG. 5 is a side elevational view of a lower rocker lever as one component part of the transport mechanism.

As shown in FIG. 5, the lower rocker lever 8 also has a bore 16, hence being capable of also accomodating the rocker lever shaft 7. Also in correspondence with the upper rocker lever 9, the lower rocker lever 8 has a groove 17 at its left end in the drawing, the course of which is approximately horizontal initially, but then changes to an upward inclination. A disc 18 is positioned at the end of the rocker lever 8 opposite the groove 17, with this disc being capable of being driven by a motor 19 in both directions of rotation.

Figures 2, 3:
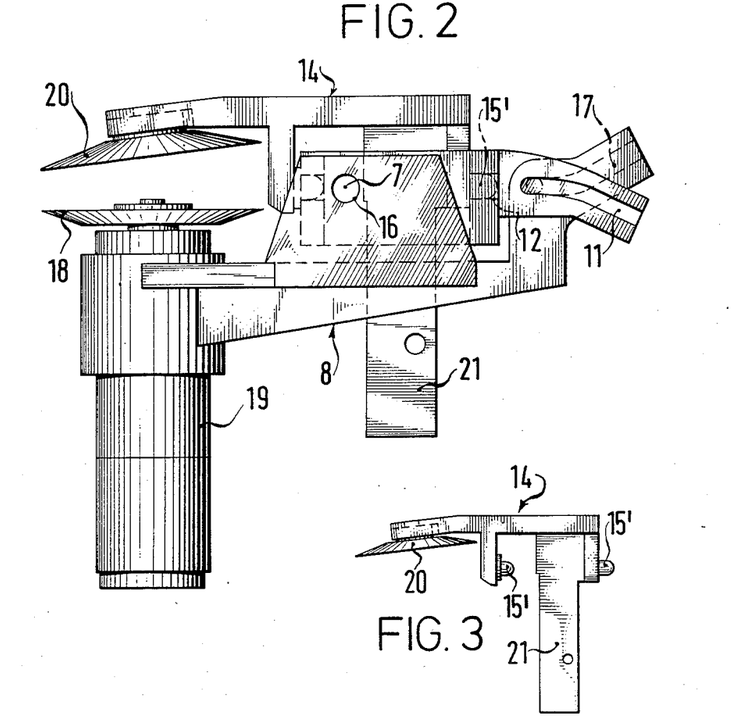
FIG. 2 is a side elevational view of the upper portion of the transport mechanism according to FIG. 1 in which some component parts have been omitted for illustrative clarity.
FIG. 3 is a side elevational view of a brace as one component part of the transport mechanism.

As shown in FIG. 3, a second disc 20 is supported on a carrier 14 on which it can rotate, the former not being driven by a motor and being positioned opposite the disc 18 when mounted. In order to force and limit the tilting of the carrier 14 on the rocker lever 9, the carrier 14 has a depending tab 21 to which further reference will be made later.

Figure 6:
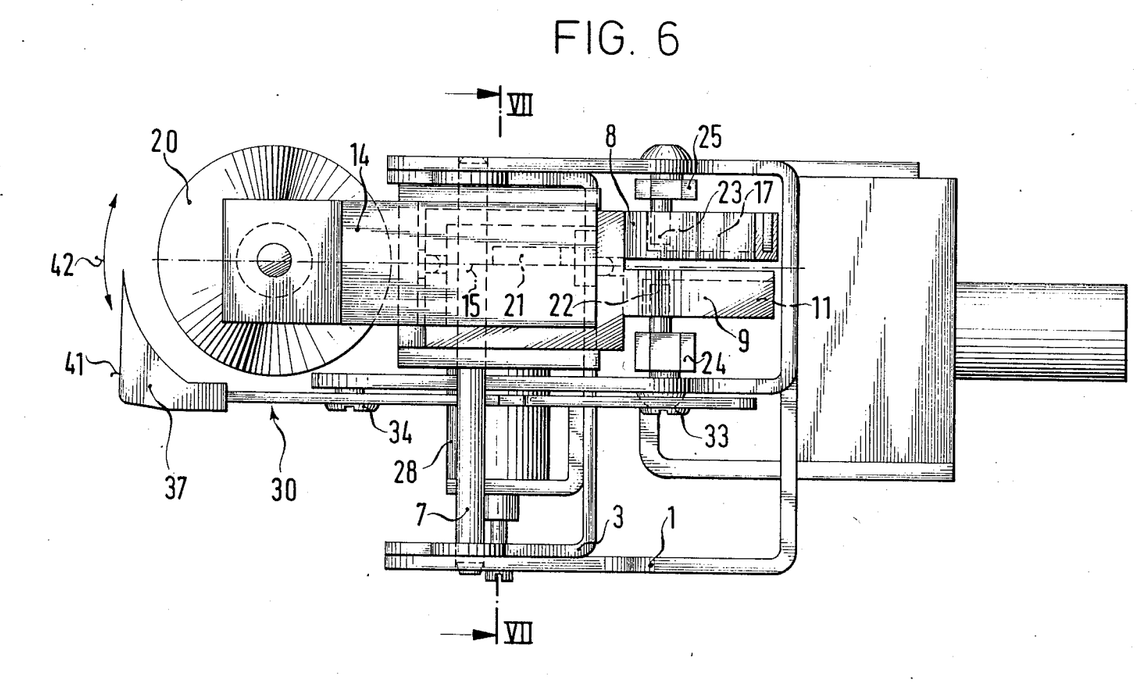
FIG. 6 is a top plan view of the transport mechanism of the invention according to FIG. 1.

For further explanation of the invention FIG. 6 be referred to in particular. First of all, a frame 1 can be seen having a pivoting lever 3 supported on the shaft 2 as well as the rocker lever shaft 7 supporting the rocker levers 8 and 9. Two pins 22 and 23 reach into the grooves 17 and 11 from opposite sides. These pins 22 and 23 are each mounted eccentrically on adjustment screws 25 and 26 with the latter mounted in the frame and capable of being turned.

When turning these adjustment screws 25 and 26, the position of the pins 21 and 22 can be changed, thereby adjusting the rocker levers 8 and 9.

Figure 7:
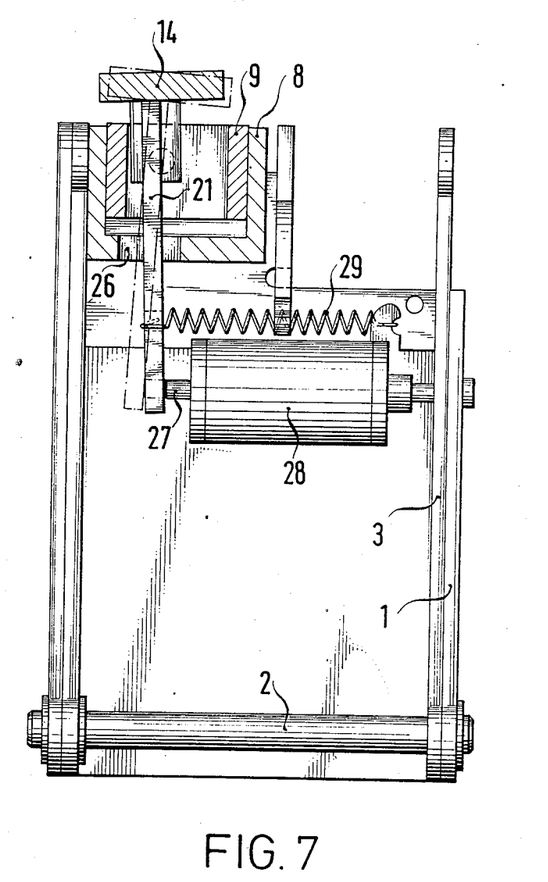
FIG. 7 is a vertical sectional view along the line VII—VII in FIG. 6.

FIG. 7 illustrates the manner in which the carrier 14 tilts in relation to the rocker lever 9. One can see that the tab 21 passes through an opening 26 of the rocker lever 8 and that it rests against the ram 27 of another lifting magnet 28. This lifting magnet 28 is fixed to the pivoting lever 3. A tension spring 29, tensioned between the tab 21 and the pivoting lever 3, keeps the tab in direct contact with the ram 27. When the lifting magnet is excited, the ram 27 moves towards the left in the drawing, resulting in the carrier 14 tilting clockwise into the final position marked with a broken line in the drawing.

The transport mechanism illustrated is designed for transporting film cards from a film card magazine to the film card holder or in the reverse direction. The film cards are not guided in the area where the transport mechanism can operate. Therefore the edges of the film cards facing the transport mechanism can be of irregular alignment or can even make direct contact with one another. This necessitates the use of a separator, the design of which is above all revealed in FIG. 8.

Figure 8:
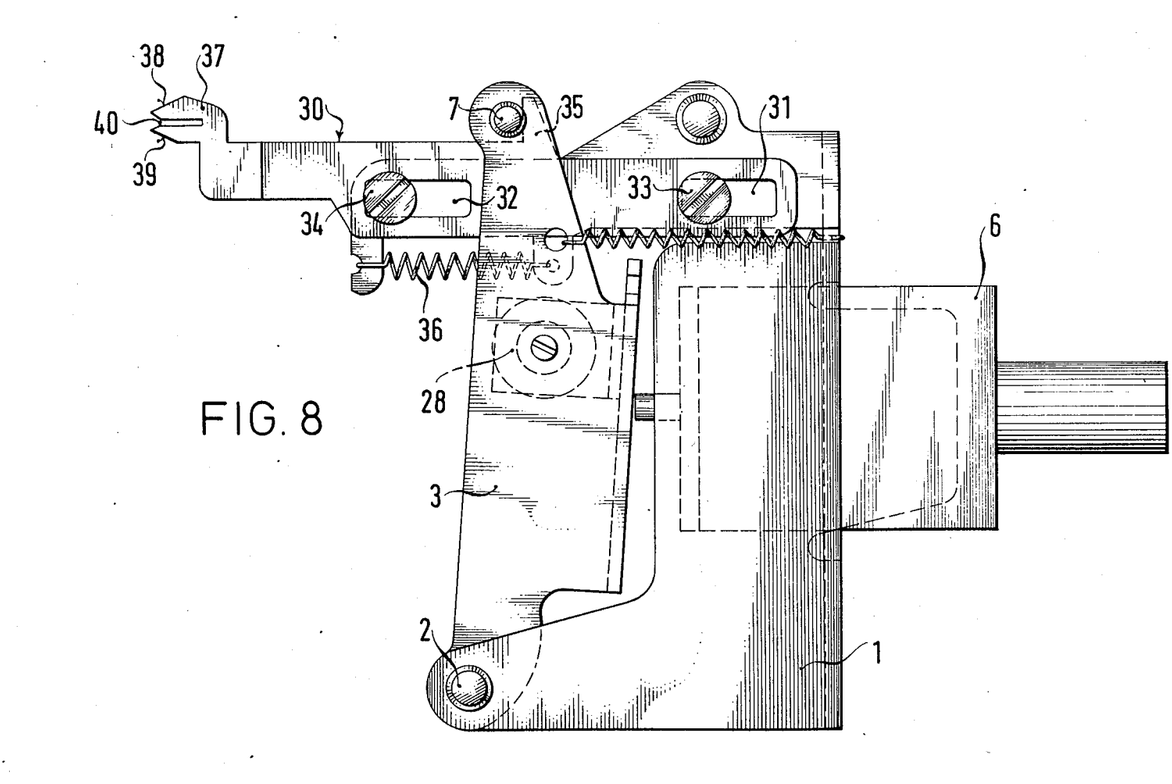
FIG. 8 is a side elevational view of the transport mechanism showing another embodiment.

The separator generally designated 30 is a basically flat component featuring two elongated holes 31 and 32, through which two screws 33 and 34 reach in such a manner that the separator 30 can move towards the left in FIG. 8 as governed by the length of the elongated holes. In the resting position shown in the drawing the separator 30, can, however, not move towards the left, because a separator cam 35 rests against the rocker lever shaft 7.

When the pivoting lever 3 swivels counter-clockwise, however, the separator 30 initially follows this motion, since a tension spring 36 gives it pretension in this direction. Yet, before the pivoting lever 3 reaches its final position, the elongated holes 31 and 32 limit the further travel of the separator 30. The discs 18 and 20 illustrated in FIG. 1 can therefore move farther to the left in the drawing than the separator.

The separating effect of the separator is brought about by a specially designed separating head 37. Between diverging surfaces 38 and 39 the separating head 37 has a slot 40 capable of taking up one individual film card. It is furthermore of importance for the proper functioning of the separator that the leading edge of the separator head 37 be at a slightly inclined angle in relation to the direction of transport as shown in FIG. 6. The direction of transport is marked by an arrow in 42 in FIG. 6. This inclination of the leading edge 41 results in the film cards to be transported to be picked up and inserted into the slot 40 of the separating head 37 at the corner of the separating head most distant from the discs 18 and 20.

The transport mechanism functions as follows:

When a film card is to be transported, the pivoting lever 3 is made to pivot counter-clockwise through excitation of the lifting magnet 6. The rocker lever shaft 7 carries the rocker levers 8 and 9 towards the left in the drawing at the same time. The provision of the pins 22 and 23 and the grooves 11 and 17 results in the discs 18 and 20 minimally altering their relative distance, if at all, yet performing a relatively fast gripping motion towards the end of the travel of the pivoting lever 3, hence gripping the film card to be transported in a pincer-wise manner. The two discs 18 and 20 are driven by a motor 19, making it possible to obtain the desired transport motion.

In accordance with the transport mechanism such as disclosed in the parent application, the disc 20 tilts into the respective direction of transport, with said disc being forced to tilt through excitation of the lifting magnet 28.

Before the film card to be transported enters the gap between the discs 18 and 20, the slot 40 of the separating head 37 grips over them, resulting in exact guidance of the respective film card at the point of time the discs 18 and 20 grip it.

Figure 9:
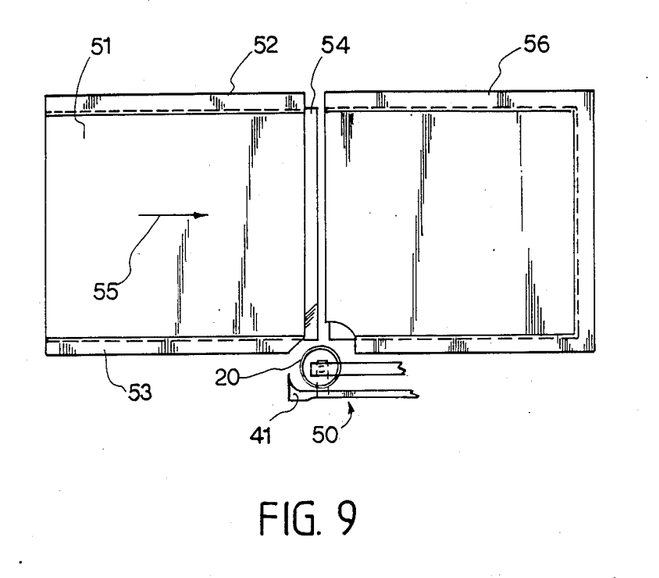
FIG. 9 is a diagrammatic plan view of a platform of a microfilm reading machine and a film card cassette schematically showing the transport mechanism.

Referring to FIG. 9, the relative placement of the transport mechanism, generally designated by the numeral 50, with the other elements of the microfilm machine is shown. There is a film platform 51 which has two guides 52 and 53 on the opposite sides thereof. Guides 52 and 53 retain a film card 54 upon the film platform 51. The card is slidable in the direction of the arrow 55. A cassette 56 into which the film cards 54 can slide is arranged beside the film platform 51. Transport device 50 is disposed on one side of film platform 51 immediately in from of guide 53 and in front of cassette 56.

We claim:

1. A mechanism for transporting a film card or comparable object guided between two straight guides from one position to another comprising a feeder mechanism for gripping and transporting the film card or comparable object; said feeder mechanism being positioned at the end of a straight guide where transport is carried out and being movable at right angles to the film card or comparable object and having two discs which are able to rotate and to perform a pincer-wise motion toward the film card or comparable object and which form an acute angle in gripping position, at least one of said discs being provided with a motor, the direction of rotation of which can be reversed; two rocker levers for supporting the discs, the rocker levers being mounted pivotably on a pivoting lever that can be moved at right angles in relation to the direction of transport, each of the rocker levers having a guide groove at the end pointing away from the discs; and a stationarily mounted pin engaging each of said guide grooves.

2. A transport mechanism according to claim 1, wherein the rocker levers are supported on a pivoting lever by means of a mutual rocker lever shaft.

3. A transport mechanism according to claim 1, wherein said pins are each mounted eccentrically on an adjustment screw.

4. A transport mechanism according to claim 1, wherein in relation to the circle of pivot of the pivoting lever, the path of each of the guide grooves is initially tangential, then follows an inclined angle.

5. A transport mechanism according to claim 1, wherein the pivoting lever is retained in a resting position by means of a tension spring and said transport mechanism includes a lifting magnet for pushing the pivoting lever into an operating position of the two discs.

6. A mechanism for transporting a film card or comparable object guided between two straight guides from one position to another comprising a feeder mechanism for gripping and transporting the film card or comparable object; said feeder mechanism being positioned at the end of a straight guide where transport is carried out and being movable at right angles to the film card or comparable object and having two discs which are able to rotate and to perform a pincer-wise motion toward the film card or comparable object and which form an acute angle in gripping position, at least one of said discs being provided with a motor, the direction of rotation of which can be reversed; a carrier means; and two rocker levers, one of said rocker levers supporting one of said discs, said carrier means being fixed to the other rocker lever in such a manner that it can pivot between two stops and around an axis at right angles in relation to the direction of transport, the other disc being supported on said carrier means, the rocker levers being mounted pivotably on a pivoting lever that can be moved at right angles in relation to the direction of transport, the rocker levers having a stationary support via a groove at the end of each of the levers pointing away from the discs and cooperating with a stationarily mounted pin.

7. A transport mechanism according to claim 6, wherein the carrier is held against one of its stops by means of a tension spring and a lifting magnet is provided for purposes of pivoting the carrier towards the other stop.

8. A mechanism for transporting a film card or comparable object guided between two straight guides from one position to another comprising a feeder mechanism for gripping and transporting the film card or comparable object; said feeder mechanism being positioned at the end of a straight guide where transport is carried out and being movable at right angles to the film card or comparable object and having two discs which are able to rotate and to perform a pincer-wise motion toward the film card or comparable object and which form an acute angle in gripping position, at least one of said discs being provided with a motor, the direction of rotation of which can be reversed, two rocker levers for supporting the discs, the rocker levers being mounted pivotably on a pivoting lever that can be moved at right angles in relation to the direction of transport, the rocker levers having a stationary support via a groove at the end of each of the levers pointing away from the discs and cooperating with a stationarily mounted pin, at least one side of the rocker levers being provided with a separator which is capable of advancing faster than the discs in the direction of the film cards or comparable objects to be transported and then comes to a stop, said separator having a slot formed by two separating surfaces for accommodating film cards or comparable objects.

9. A transport mechanism according to claim 8, wherein the edge of the separating head of the separator facing the film cards or comparable objects is at an inclined angle in relation to the direction of transport in the plane of the film cards or comparable objects.

10. A transport mechanism according to claim 8, wherein the separator is pretensioned in the direction of the film card or comparable object by means of a tension spring and it rests against the rocker lever shaft with a cam, the travel of the rocker levers following the rocker lever shaft being limited by elongated holes in said separator.

* * * * *